United States Patent
Higuchi

(10) Patent No.: US 7,467,270 B2
(45) Date of Patent: Dec. 16, 2008

(54) INFORMATION PROCESSING APPARATUS, INFORMATION PROCESSING METHOD AND PROGRAM

(75) Inventor: Tomohisa Higuchi, Chiba (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 329 days.

(21) Appl. No.: 10/785,063

(22) Filed: Feb. 25, 2004

(65) Prior Publication Data

US 2004/0181629 A1    Sep. 16, 2004

(30) Foreign Application Priority Data

Mar. 14, 2003  (JP)  ............... 2003-069859

(51) Int. Cl.
G06F 12/14 (2006.01)
G06F 13/16 (2006.01)

(52) U.S. Cl. ............... 711/163; 711/115; 711/154

(58) Field of Classification Search ............ 711/115, 711/154, 163
See application file for complete search history.

(56) References Cited

U.S. PATENT DOCUMENTS

| | | | | |
|---|---|---|---|---|
| 5,378,887 | A * | 1/1995 | Kobayashi | 235/492 |
| 6,351,845 | B1 * | 2/2002 | Hinker et al. | 717/128 |
| 6,424,029 | B1 | 7/2002 | Giesler | |
| 7,031,946 | B1 * | 4/2006 | Tamai et al. | 705/67 |
| 2002/0188852 | A1 * | 12/2002 | Masaki et al. | 713/182 |
| 2003/0137887 | A1 * | 7/2003 | Nakabe et al. | 365/200 |
| 2004/0015560 | A1 * | 1/2004 | Yamaguchi et al. | 709/217 |
| 2004/0035930 | A1 * | 2/2004 | Arisawa et al. | 235/451 |

FOREIGN PATENT DOCUMENTS

| | | |
|---|---|---|
| EP | 0 557 934 | 9/1993 |
| JP | 11-155051 | 6/1999 |
| JP | 2000-278402 | 10/2000 |
| JP | 2003-060748 | 2/2003 |
| WO | WO 01/24108 | 4/2001 |

OTHER PUBLICATIONS

Patent Abstracts of Japan, JP 2003-006578, Jan. 10, 2003.
Patent Abstracts of Japan, JP 2003-006578, Jan. 10, 2003.

* cited by examiner

*Primary Examiner*—Gary J Portka
*Assistant Examiner*—Shawn Eland
(74) *Attorney, Agent, or Firm*—Oblon, Spivak, McClelland, Maier & Neustadt, P.C.

(57) ABSTRACT

When there is access to a non-contact type IC, the access is controlled, and external access is notified. A control unit of a non-contact type IC detects access from an external apparatus in response to variation in a load of an antenna, and notifies the detection as access information to a signal judging unit. The signal judging unit refers to history information recorded in a storing unit on the basis of the notified access information, determines whether or not to permit the external apparatus the access, and then notifies a result of the determination to a CPU. On the basis of the notified result of the determination, the CPU controls a display unit, a speaker, a light generating unit, or a vibration generating unit to generate a predetermined stimulus in order to notify the external access. The present invention is applicable to transmission apparatus including a non-contact type IC.

15 Claims, 6 Drawing Sheets

F I G. 1
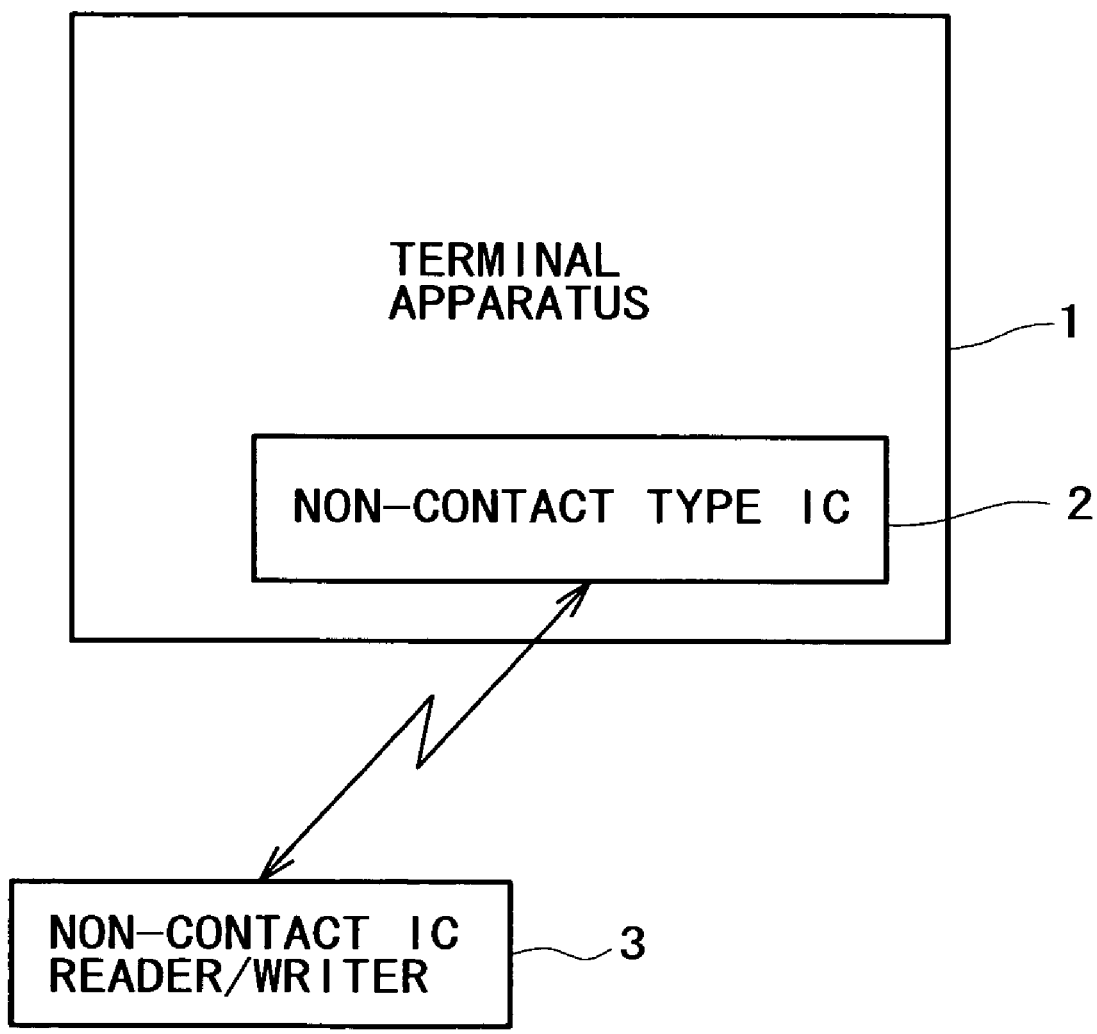

F I G. 3

| ACCESS DATE | ACCESS SOURCE | ACCESS DESCRIPTION | ACCESS PERMISSION/ DENIAL |
|---|---|---|---|
| 2003/1/1 | 0001 | DATA READING | PERMITTED |
| 2003/1/1 | 0015 | DATA REWRITING | DENIED |
| ..... | ..... | ..... | ..... |

F I G. 4
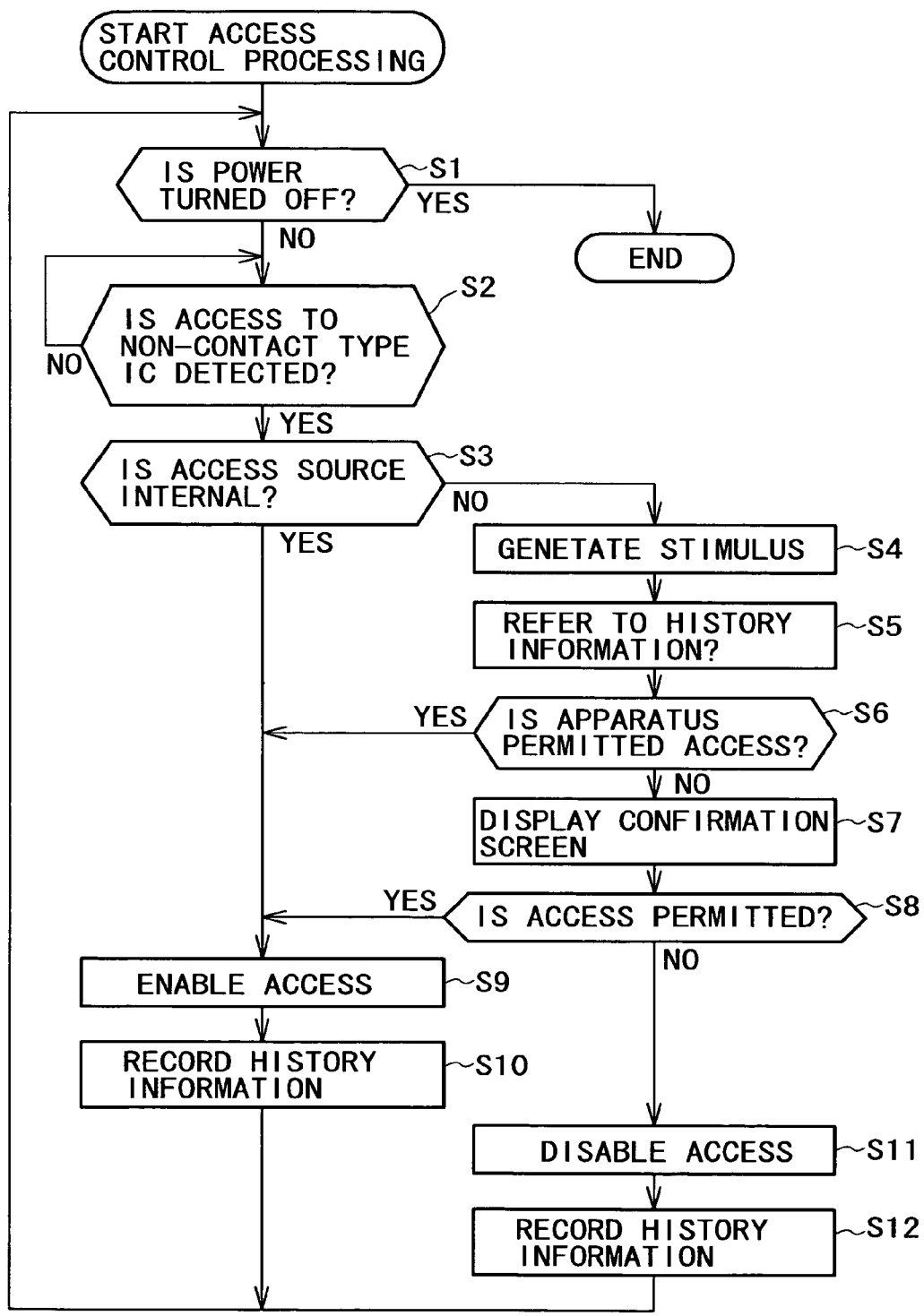

F I G. 6
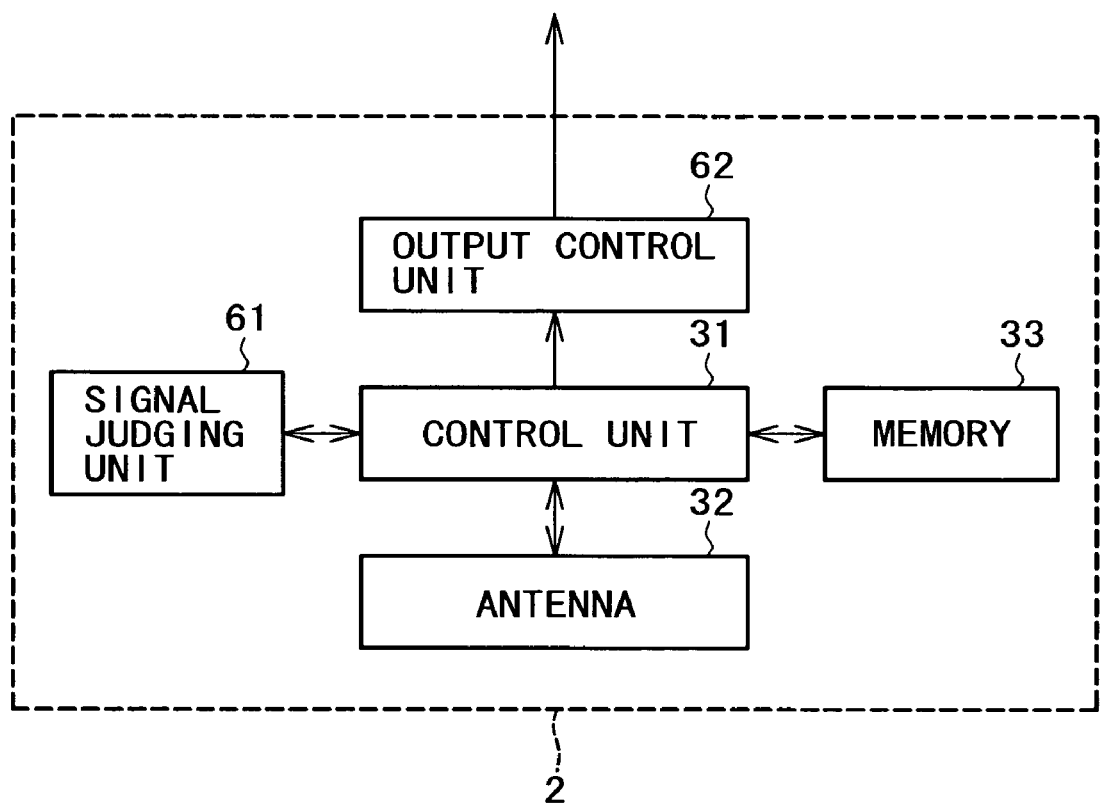

INFORMATION PROCESSING APPARATUS, INFORMATION PROCESSING METHOD AND PROGRAM

BACKGROUND OF THE INVENTION

The present invention relates to an apparatus and a method for information processing, a recording medium, and a program, and particularly to an apparatus and a method for information processing, a recording medium, and a program that restrict external access to a non-contact type IC, for example.

A card is a typical medium including a non-contact type IC. The card includes the non-contact type IC, an antenna, and the like. A load of the antenna is varied by electromagnetic waves radiated from an external reader/writer, whereby data is read and written in the non-contact type IC.

Since the non-contact type IC card does not need to be brought into direct contact with the reader/writer, the non-contact type IC card is easy to handle, and has a wide range of applications. For example, a method is proposed which controls user access by a non-contact type IC card having a personal ID registered therein (see Patent Literature 1).

[Patent Literature 1]
  Japanese Patent Laid-Open No. 2003-6578

When the non-contact type IC is incorporated in a terminal apparatus such as a portable telephone, a personal computer or the like, functions specific to the terminal apparatus can be used. For example, by including a reader/writer in a terminal apparatus, the transmission apparatus itself can read and write data in the non-contact type IC.

However, since the non-contact type IC allows non-contact reading and writing, important data can be read easily by an unauthorized person, and thus the non-contact type IC has a problem of being lacking in security.

SUMMARY OF THE INVENTION

The present invention has been made in view of the above, and it is accordingly an object of the present invention to, when there is access to a non-contact type IC, control the access and inform a user of external access.

According to the present invention, there is provided a first information processing apparatus including: communicating means for communicating data with an information recording medium; detecting means for detecting access to the information recording medium; determining means for determining whether a result of detection by the detecting means indicates access by the communicating means or access from an external apparatus; and access controlling means for controlling the access from the external apparatus when the determining means determines that the result of detection by the detecting means indicates the access from the external apparatus.

The first information processing apparatus can further include recording means for recording history information on access when the detecting means detects the access to the information recording medium.

The access controlling means can refer to the history information recorded in the recording means and, when history information corresponding to the external apparatus is retrieved, control the access from the external apparatus on the basis of the history information.

The access controlling means can refer to the history information recorded in the recording means and, when history information corresponding to the external apparatus is not retrieved, display a selection screen for allowing selection of permission or denial of the access; and the recording means can record history information on a basis of an operation of the selection screen by a user.

The information recording medium can be a non-contact type IC.

According to the present invention, there is provided a first information processing method including: a communicating step for communicating data with an information recording medium; a detecting step for detecting access to the information recording medium; a determining step for determining whether a result of detection by processing of the detecting step indicates access by processing of the communicating step or access from an external apparatus; and an access controlling step for controlling the access from the external apparatus when processing of the determining step determines that the result of detection by the processing of the detecting step indicates the access from the external apparatus.

According to the present invention, there is provided a program recorded on a first recording medium and executed by a computer, the program including: a communicating step for communicating data with an information recording medium; a detecting step for detecting access to the information recording medium; a determining step for determining whether a result of detection by processing of the detecting step indicates access by processing of the communicating step or access from an external apparatus; and an access controlling step for controlling the access from the external apparatus when processing of the determining step determines that the result of detection by the processing of the detecting step indicates the access from the external apparatus.

According to the present invention, there is provided a first program executed by a computer, the program including: a communicating step for communicating data with an information recording medium; a detecting step for detecting access to the information recording medium; a determining step for determining whether a result of detection by processing of the detecting step indicates access by processing of the communicating step or access from an external apparatus; and an access controlling step for controlling the access from the external apparatus when processing of the determining step determines that the result of detection by the processing of the detecting step indicates the access from the external apparatus.

In a first invention, access to the information recording medium is detected, whether the detection result indicates internal access or access from an external apparatus is determined, and when it is determined that the detection result indicates the access from the external apparatus, the access from the external apparatus is controlled.

As described above, according to the first invention, access to the non-contact type IC can be detected. In particular, when access to the non-contact type IC is detected, it is possible to determine whether to permit the access and control the access.

According to the present invention, there is provided a second information processing apparatus including: communicating means for communicating data with an information recording medium; detecting means for detecting access to the information recording medium; determining means for determining whether a result of detection by the detecting means indicates access by the communicating means or access from an external apparatus; and informing means for, when the determining means determines that the result of detection by the detecting means indicates the access from the external apparatus, notifying the access.

The informing means can notify the access by warning display, sound, light, or vibration.

The informing means can change an informing method according to an access source.

The second information processing apparatus can further include recording means for recording history information on access when the detecting means detects the access to the information recording medium.

The information recording medium can be a non-contact type IC.

According to the present invention, there is provided a second information processing method including: a communicating step for communicating data with an information recording medium; a detecting step for detecting access to the information recording medium; a determining step for determining whether a result of detection by processing of the detecting step indicates access by processing of the communicating step or access from an external apparatus; and an informing step for, when processing of the determining step determines that the result of detection by the processing of the detecting step indicates the access from the external apparatus, notifying the access.

According to the present invention, there is provided a program recorded on a second recording medium and executed by a computer, the program including: a communicating step for communicating data with an information recording medium; a detecting step for detecting access to the information recording medium; a determining step for determining whether a result of detection by processing of the detecting step indicates access by processing of the communicating step or access from an external apparatus; and an informing step for, when processing of the determining step determines that the result of detection by the processing of the detecting step indicates the access from the external apparatus, notifying the access.

According to the present invention, there is provided a second program executed by a computer, the program including: a communicating step for communicating data with an information recording medium; a detecting step for detecting access to the information recording medium; a determining step for determining whether a result of detection by processing of the detecting step indicates access by processing of the communicating step or access from an external apparatus; and an informing step for, when processing of the determining step determines that the result of detection by the processing of the detecting step indicates the access from the external apparatus, notifying the access.

In a second invention, access to the information recording medium is detected, whether the detection result indicates internal access or access from an external apparatus is determined, and when it is determined that the detection result indicates the access from the external apparatus, the access is notified.

According to the second invention, access to the non-contact type IC can be detected. In particular, when external access to the non-contact type IC is detected, it is possible to inform a user of the access.

BRIEF DESCRIPTION OF THE DRAWINGS

FIG. 1 is a diagram showing a connection between a non-contact IC reader/writer and a terminal apparatus according to an embodiment of the present invention;

FIG. 3 is a diagram showing an example of history information recorded by a storing unit;

FIG. 4 is a flowchart of assistance in explaining access control processing;

FIG. 6 is a diagram showing an example of configuration of another non-contact type IC.

DETAILED DESCRIPTION OF THE PREFERRED EMBODIMENTS

Preferred embodiments of the present invention will hereinafter be described with reference to the drawings.

FIG. 1 shows a connection between a non-contact IC reader/writer 3 and a terminal apparatus 1 according to an embodiment of the present invention.

The terminal apparatus 1 comprises a portable telephone, for example. The terminal apparatus 1 can read and write various data from and to a non-contact type IC 2 included therein. The terminal apparatus 1 detects an access from the non-contact IC reader/writer 3 to the non-contact type IC 2, and informs a user of the access. The terminal apparatus 1 further restricts the access (which will be described later in detail).

In addition to the reading and writing of various data from and to the non-contact type IC 2 by the terminal apparatus 1, various data can be read or written from or to the non-contact type IC 2 via electromagnetic waves radiated from the non-contact IC reader/writer 3. Specifically, in response to electromagnetic waves radiated from the non-contact IC reader/writer 3, the non-contact type IC 2 can notify data recorded in a memory 33 (FIG. 2) to the non-contact IC reader/writer 3 or record data transmitted from the non-contact IC reader/writer 3 in the memory 33.

The non-contact IC reader/writer 3 radiates electromagnetic waves to the non-contact type IC 2, and transmits and receives various data on the basis of change in a load of an antenna (not shown) to the non-contact type IC 2.

Figure 2:
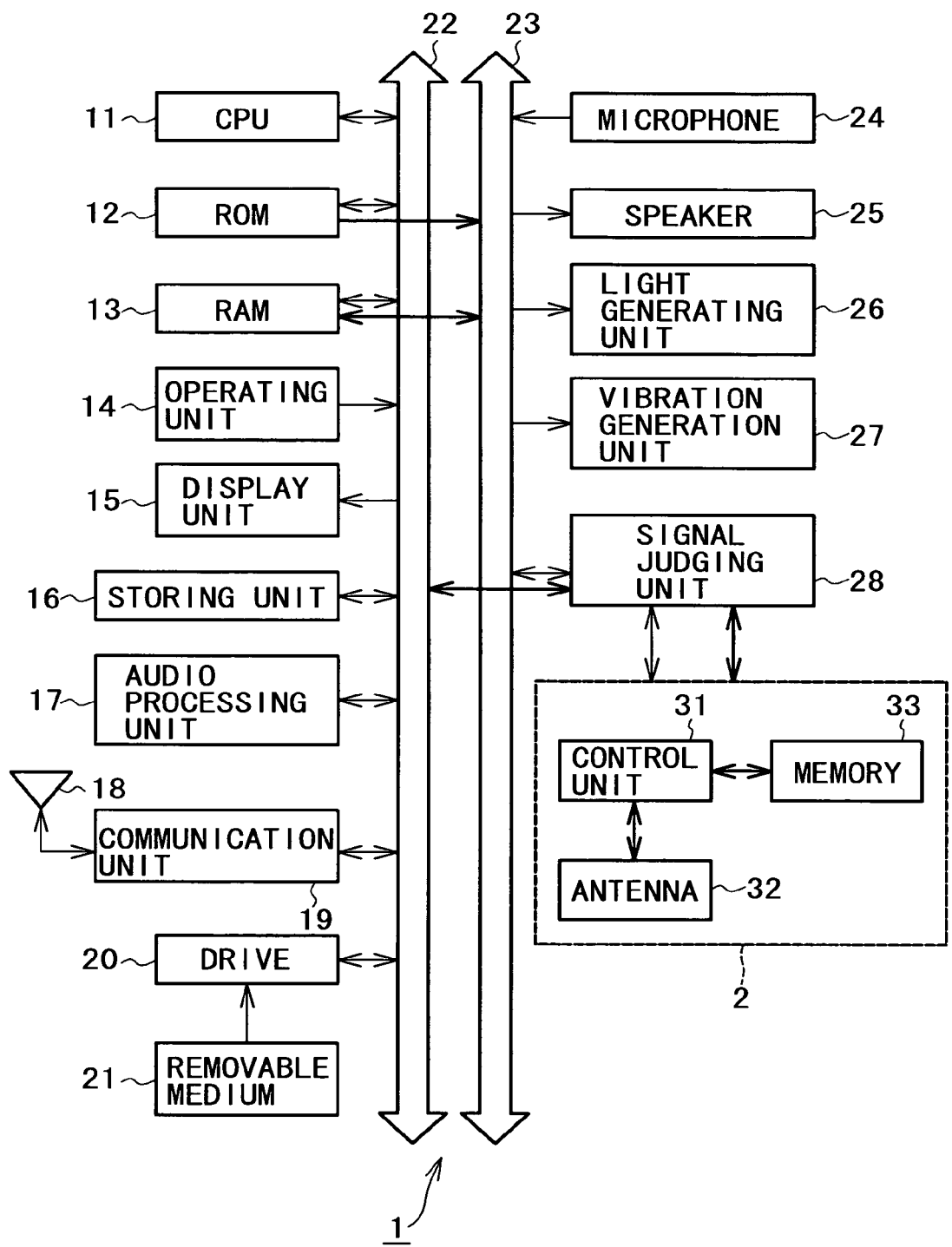
FIG. 2 is a block diagram showing an example of configuration within the terminal apparatus.

FIG. 2 is a block diagram showing an example of configuration within the terminal apparatus 1. As shown in FIG. 2, a CPU (Central Processing Unit) 11, a ROM (Read Only Memory) 12, a RAM (Random Access Memory) 13, an operating unit 14, a display unit 15, a storing unit 16, an audio processing unit 17, a communication unit 19, a drive 20, and a signal judging unit 28 are interconnected via a control line 22 for transmitting control data and the like. Also, the ROM 12, the RAM 13, a microphone 24, a speaker 25, a light generating unit 26, a vibration generating unit 27, and the signal judging unit 28 are interconnected via a data line 23 for transmitting audio data and the like. These parts are brought into an operable state by power supplied from a power supply circuit not shown in the figure.

The CPU 11 performs various processing according to an access control program stored in the ROM 12 or an access control program loaded from the storing unit 16 into the RAM 13. Generally, the ROM 12 stores basically fixed data of parameters for calculations and various programs to be used by the CPU 11. The ROM 12 also stores a terminal ID of the terminal apparatus 1. The RAM 13 stores data and the like necessary for the CPU 11 to perform various processing as required.

The operating unit 14 comprises buttons, switches, a jog dial or the like. The operating unit 14 inputs various instructions corresponding to operations by a user to the CPU 11.

The display unit 15 comprises a display such as an LCD (Liquid Crystal Display) or the like. The display unit 15 displays various information in the form of text and images.

The storing unit 16 comprises a nonvolatile memory or the like. The storing unit 16 records various programs to be executed by the CPU 11, data and the like. The storing unit 16 also records history information when access is made to the non-contact type IC 2 from an external apparatus such as the non-contact IC reader/writer 3 or the like, or the terminal apparatus 1 (internal) (details will be described later with reference to FIG. 3).

The audio processing unit 17 subjects high-frequency data supplied from the communication unit 19 to spectrum despreading processing, thereby converts the high-frequency data into an analog audio signal, and then outputs the analog audio signal to the speaker 25. Also, the audio processing unit 17 converts an audio signal obtained by collecting sound by the microphone 24 into digital audio data, subjects the digital audio data to spectrum spreading processing, and then outputs the result to the communication unit 19.

An antenna 18 transmits and receives radio waves to and from a base station (not shown), or a fixed radio station. The communication unit 19 amplifies a received signal received by the antenna 18, subjects the signal to frequency conversion processing and analog-to-digital conversion processing, and then outputs the result to the audio processing unit 17. Also, the communication unit 19 subjects digital audio data supplied from the audio processing unit 17 to digital-to-analog conversion processing and frequency conversion processing, and then transmits the result via the antenna 18.

The drive 20 is connected to the terminal apparatus 1 as required. A removable medium 21 such as a magnetic disk, an optical disk, a magneto-optical disk, a semiconductor memory or the like is inserted into the drive 20 as required. An access control program read from the removable medium 21 is installed in the storing unit 16 as required.

The microphone 24 converts audio obtained by collecting sound into an electric signal, and then outputs the electric signal to the audio processing unit 17 via the data line 23. The speaker 25 outputs predetermined audio corresponding to data supplied via the data line 23 or the analog audio signal.

The light generating unit 26 generates predetermined light corresponding to an electric signal supplied from the CPU 11. The vibration generating unit 27 generates a predetermined vibration corresponding to an electric signal supplied from the CPU 11.

The signal judging unit 28 is connected to the non-contact type IC 2. The signal judging unit 28 reads or writes various data from or to the non-contact type IC 2. Also, the signal judging unit 28 refers to history information recorded in the storing unit 16 on the basis of access information notified from the non-contact type IC 2, determines whether an external apparatus (for example the non-contact IC reader/writer 3) making access to the non-contact type IC 2 is permitted the access, and then notifies a result of the determination to the CPU 11.

The non-contact type IC 2 comprises a control unit 31, an antenna 32, and a memory 33. The control unit 31 includes a CPU, a ROM, a RAM and the like. The control unit 31 reads data in the memory 33 or writes data to the memory 33 in response to variation in a load of the antenna 32. The antenna 32 varies the load in response to electromagnetic waves radiated from the non-contact IC reader/writer 3, and thereby transmits and receives various data.

FIG. 3 shows an example of history information recorded by the storing unit 16. In the storing unit 16, an access source, an access description, and access permission/denial are recorded in correspondence with an access date.

The access date indicates a date of access to the non-contact type IC 2. The access source indicates a terminal ID of an external apparatus making access to the non-contact type IC 2. The access description indicates a description of access to the non-contact type IC 2. The access permission/denial indicates whether the access from the external apparatus to the non-contact type IC 2 is permitted or not.

In the example of FIG. 3, a terminal ID of "0001", an access description of "data reading", and information "permitted" on access permission/denial are recorded in association with an access date of "2003/1/1". Also, a terminal ID of "0015", an access description of "data rewriting", and information "denied" on access permission/denial are recorded in association with the access date of "2003/1/1".

Access control processing performed by the terminal apparatus 1 when access to the non-contact type IC 2 is made will next be described with reference to a flowchart of FIG. 4. This processing is performed by starting an access control program when power to a main unit of the terminal apparatus 1 is turned on.

At a step S1, the CPU 11 determines whether a power supply button, not shown, is operated by a user and thereby power to the main unit is turned off. When the CPU 11 determines at the step S1 that power to the main unit is not turned off, the processing proceeds to a step S2. That is, the access control processing is performed at all times while power to the terminal apparatus 1 is on.

At the step S2, the signal judging unit 28 determines whether an access to the non-contact type IC 2 is detected. That is, the signal judging unit 28 determines whether access information is notified from the non-contact type IC 2, and stands by until an access to the non-contact type IC 2 is detected.

Specifically, for example, when the user performs an operation for access to the non-contact type IC 2 using the operating unit 14, the CPU 11 controls the signal judging unit 28 on the basis of the operation to access the non-contact type IC 2. Thus, the control unit 31 of the non-contact type IC 2 detects that access to the non-contact type IC 2 is made from the terminal apparatus 1, and notifies the detection as access information to the signal judging unit 28.

Alternatively, for example, when the non-contact IC reader/writer 3 is brought close to the terminal apparatus 1, an electromagnetic wave radiated from the non-contact IC reader/writer 3 is received by the antenna 32 of the non-contact type IC 2. Thus, the control unit 31 of the non-contact type IC 2 detects access from the non-contact IC reader/writer 3 in response to variation in the load of the antenna 32, and notifies the detection as access information to the signal judging unit 28.

When the signal judging unit 28 determines at the step S2 that an access to the non-contact type IC 2 is detected, that is, when the signal judging unit 28 determines that access information is notified from the non-contact type IC 2, the processing proceeds to a step S3. The signal judging unit 28 determines on the basis of the notified access information whether the access source is internal.

When the signal judging unit 28 determines at the step S3 that the access source is internal, that is, when the signal judging unit 28 determines that the access source is the signal judging unit 28 itself (terminal apparatus 1), the signal judging unit 28 notifies the CPU 11 of the internal access. The processing then proceeds to a step S9. On the other hand, when the signal judging unit 28 determines at the step S3 that the access source is not internal, that is, when the signal judging unit 28 determines that the access source is an external apparatus such as the non-contact IC reader/writer 3, the signal judging unit 28 notifies the CPU 11 of the access from the external apparatus. The processing then proceeds to a step S4.

At the step S4, on the basis of the notification from the signal judging unit 28, the CPU 11 controls the display unit 15, the speaker 25, the light generating unit 26, or the vibration generating unit 27 to generate a predetermined stimulus in order to inform the user of the external access to the non-contact type IC 2.

Thereby, the display unit 15 displays a warning message saying "External access detected", for example, the speaker 25 outputs the warning message as audio, the light generating unit 26 generates predetermined light, and the vibration generating unit 27 generates a predetermined vibration, to thus inform the user of the detection of the access.

The stimulus may be generated by using one of these informing means or a combination of these informing means. The informing means can be arbitrarily selected and set in the terminal apparatus 1 by the user.

After the predetermined stimulus is generated at the step S4, the signal judging unit 28 refers to history information (FIG. 3) recorded in the storing unit 16 at a step S5. Then, at a step S6, the signal judging unit 28 determines whether the external apparatus accessing the non-contact type IC 2 is permitted the access.

When the access source is an external apparatus having the terminal ID of "0001", for example, since access is permitted to the apparatus in the example of FIG. 3, the signal judging unit 28 determines that the apparatus is permitted the access.

When the access source is an external apparatus having the terminal ID of "0015", for example, since access is not permitted to the apparatus in the example of FIG. 3, the signal judging unit 28 determines that the apparatus is not permitted the access.

When the terminal ID of the access source is not recorded in the storing unit 16, for example, the signal judging unit 28 determines that the apparatus is making a first access. The apparatus is not permitted access yet at the step S6.

When the signal judging unit 28 determines at the step S6 that the external apparatus accessing the non-contact type IC 2 is permitted the access, the signal judging unit 28 notifies the determination result to the CPU 11. The processing then proceeds to the step S9. On the other hand, when the signal judging unit 28 determines at the step S6 that the external apparatus accessing the non-contact type IC 2 is not permitted the access, the signal judging unit 28 notifies the determination result to the CPU 11. The processing then proceeds to a step S7.

Figure 5:
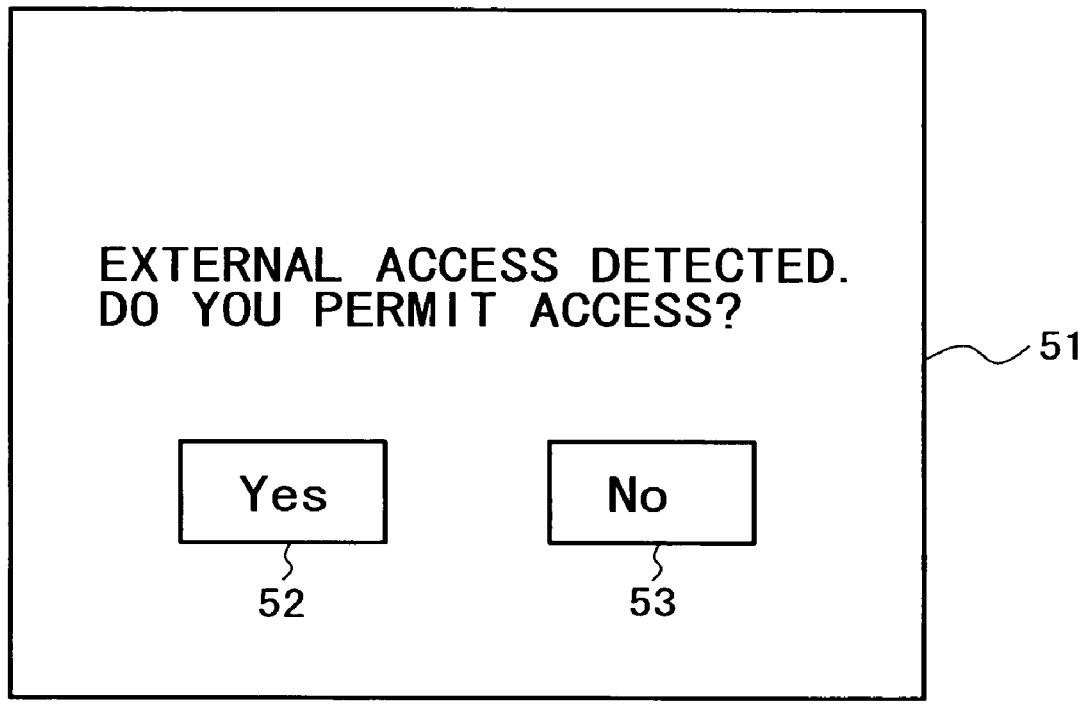
FIG. 5 is a diagram showing an example of display of a confirmation screen.

When the signal judging unit 28 notifies the CPU 11 of the determination result indicating that the external apparatus is not permitted the access, the CPU 11 controls the display unit 15 to display a confirmation screen 51 as shown in FIG. 5 at the step S7. The user is prompted to select permission or denial of the access at the step S7.

A message saying "External access detected. Do you permit access?" and a Yes button 52 and a No button 53 are displayed on the confirmation screen 51 shown in FIG. 5. Incidentally, while the message indicating the access is displayed on the confirmation screen 51, the access source, the access description and the like can be displayed in addition to the message.

The user sees the message on the confirmation screen 51. The user selects the Yes button 52 using the operating unit 14 when permitting the external access. The user selects the No button 53 using the operating unit 14 when denying the external access.

At a step S8, the CPU 11 determines whether the external apparatus accessing the non-contact type IC 2 is permitted the access. That is, the CPU 11 determines whether the user selected the Yes button 52 on the confirmation screen 51. When the CPU 11 determines that the external apparatus is permitted the access, the processing proceeds to the step S9.

At the step S9, the CPU 11 enables the internal access or the access from the external apparatus permitted by the user. Thus, predetermined processing is performed in response to the internal access or the access from the external apparatus to the non-contact type IC 2.

At a step S10, after the internal access or the access from the external apparatus is enabled by the processing at the step S9, the CPU 11 records the access date, the access source, the access description, and the access permission/denial ("permitted" in this case) as history information in the storing unit 16 (FIG. 3).

When the CPU 11 determines at the step S8 that the external apparatus is not permitted the access, that is, the user selected the No button 53 on the confirmation screen 51, the processing proceeds to a step S11 to disable access from the external apparatus. Thereby unauthorized access from the external apparatus to the non-contact type IC 2 is eliminated.

At a step S12, after access from the external apparatus is disabled by the processing at the step S11, the CPU 11 records the access date, the access source, the access description, and the access permission/denial ("denied" in this case) as history information in the storing unit 16 (FIG. 3).

After the processing at the step S10 or the step S12, the processing returns to the step S1 to repeat the above-described processing. Then, when it is determined at the step S1 that the power to the main unit is turned off, the processing is ended.

As described above, when access from an external apparatus to the non-contact type IC 2 is detected, the terminal apparatus 1 determines whether or not to permit the access, and generates a stimulus by displaying a warning, generating sound, generating light, or generating vibration. Therefore the user can recognize external access by a sense of vision, hearing, or touch. Thereby unauthorized access to the non-contact type IC 2 without being noticed by the user can be prevented.

In addition, the user can select informing means that makes the recognition by the user easier from the informing means for displaying a warning, generating sound, generating light, and generating vibration to notify access detection from the terminal apparatus 1. Further, by changing the informing means according to the access source, it is possible to readily distinguish between access from a specific person and access from an unknown person.

In addition, since the terminal apparatus 1 described above records history information in the storing unit 16 each time access is made to the non-contact type IC 2, it is possible to check access sources, access descriptions and the like regularly. Thus, when access is made from the same external apparatus many times in a short period of time, for example, it can be determined that the access is unauthorized. In this case, when access is made from the external apparatus next time, the CPU 11 may reject the access immediately without asking the user whether to allow the access (that is, without displaying the confirmation screen 51 in the processing of the step S7 in FIG. 4).

Further, while the description above has been made by taking a portable telephone as an example of the terminal apparatus 1, the present invention is not limited to this; for example the present invention is widely applicable to electronic apparatus such as personal computers, PDAs (Personal Digital Assistants), digital video cameras, television receivers or the like.

Further, while when access to the non-contact type IC 2 is detected, the terminal apparatus 1 determines whether or not to permit the access, the non-contact type IC 2 itself may determine whether or not to permit the access. An example of configuration of a non-contact type IC 2 in that case is shown in FIG. 6.

In the example of FIG. 6, in addition to a control unit 31, an antenna 32, and a memory 33, the non-contact type IC 2 has a signal judging unit 61 having a similar function to that of the signal judging unit 28 in the terminal apparatus 1, and an output control unit 62. The memory 33 records various data as well as history information as shown in FIG. 3, which information is recorded when access is made to the non-contact type IC 2.

Description will next be made of access control processing when access is made to the non-contact type IC 2 shown in FIG. 6. Incidentally, since the access control processing is basically the same as the access control processing performed by the terminal apparatus 1 which processing has been described with reference to the flowchart of FIG. 4, the access control processing will be described briefly.

For example, when the non-contact IC reader/writer 3 is brought close to the non-contact type IC 2, an electromagnetic wave radiated from the non-contact IC reader/writer 3 is received by the antenna 32. Thus, the control unit 31 detects access from the non-contact IC reader/writer 3 in response to variation in the load of the antenna 32, and notifies the detection as access information to the signal judging unit 61.

On the basis of the access information notified from the control unit 31, the signal judging unit 61 refers to the history information recorded in the memory 33 to determine whether to permit the non-contact IC reader/writer 3 the access, and then notifies a result of the determination to the control unit 31.

On the basis of the result of the determination notified from the signal judging unit 61, in order to inform the user of the external access to the non-contact type IC 2, the control unit 31 controls the output control unit 62 to output an electric signal corresponding to a predetermined stimulus.

Thus, when access from an external apparatus to the non-contact type IC 2 is detected, the non-contact type IC 2 itself can determine whether to permit the access.

The series of processes described above can be carried out not only by hardware but also by software. When the series of processes is to be carried out by software, a program forming the software is installed from a network or a recording medium onto a computer incorporated in special hardware, or for example a general-purpose personal computer that can perform various functions by installing various programs thereon.

As shown in FIG. 2, the recording medium is not only formed by the removable medium 21 distributed to users to provide the program separately from the apparatus proper, the removable medium 21 including a magnetic disk (including flexible disks), an optical disk (including CD-ROM (Compact Disk-Read Only Memory) and DVD (Digital Versatile Disk)), a magneto-optical disk (including MD (Mini-Disk) (trademark)), a semiconductor memory or the like which has the program recorded thereon, but also formed by the storing unit 16, the ROM 12 or the like which has the program recorded thereon and which is provided to the user in a state of being preincorporated in the apparatus proper.

It is to be noted that in the present specification, the steps describing the program recorded on the recording medium include not only processing carried out in time series in the described order but also processing carried out in parallel or individually and not necessarily in time series.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An information processing apparatus having embedded therein a non-contact type, integrated circuit (IC), the information processing apparatus comprising:

a communicating unit configured to communicate data with said non-contact type IC via data lines of the information processing apparatus that are external to, but connect to, the non-contact type IC, said non-contact type IC including a memory, a memory control unit, and an antenna;

detecting means for detecting any access to said non-contact type IC, said detecting means being external to said non-contact type IC;

determining means for determining whether a result of detection by said detecting means indicates (1) internal access by said communicating unit of the information processing apparatus via said data lines, or (2) external access from an external apparatus via said antenna, the external access resulting from a change of electromagnetic field strength detected by said antenna; and access controlling means for controlling the external access to the non-contact type IC from said external apparatus via said antenna when said determining means determines that the result of detection by said detecting means indicates the external access from said external apparatus via said antenna, and for enabling the internal access to the non-contact IC by said communicating unit of the information processing apparatus via said data lines, when said determining means determines that the result of detection by the detecting means indicates internal access by the communicating unit, wherein the memory, memory control unit, and antenna of the non-contact type IC are separate and distinct elements from the communicating unit, the detecting means, the determining means, and the access controlling means of the information processing apparatus.

2. The information processing apparatus as claimed in claim 1, further comprising recording means for recording history information of the internal or external access when said detecting means detects the internal or external access to said non-contact type IC.

3. The information processing apparatus as claimed in claim 2, wherein said access controlling means refers to said history information recorded in said recording means and, when said history information corresponding to said external apparatus is retrieved, controls the external access from said external apparatus based on said history information.

4. The information processing apparatus as claimed in claim 2, wherein said access controlling means refers to said history information recorded in said recording means and, when said history information corresponding to said external apparatus is not retrieved, displays a selection screen for allowing selection of permission or denial of the external access; and said recording means records said history information on a basis of an operation of said selection screen by a user.

5. The information processing apparatus as claimed in claim 1, further comprising:
informing means for, when said determining means determines that the result of detection by said detecting means indicates the external access from said external apparatus via said antenna, notifying a user of the external access.

6. The information processing apparatus as claimed in claim 5,
wherein said informing means notifies the user of the external access by a warning display, sound, light, or vibration.

7. The information processing apparatus as claimed in claim 5,
wherein said informing means changes an informing method according to an access source.

8. An information processing method performed by an information processing apparatus having embedded therein a non-contact type integrated circuit (IC), said information processing method comprising:
a communicating step for communicating data with said non-contact type IC using data lines of the information processing apparatus that are external to, but connect to, the non-contact type IC, said non-contact type IC including a memory, a memory control unit, and an antenna;
a detecting step for detecting, by a signal judging unit of the information processing apparatus that is external to the non-contact type IC, any access to said non-contact type IC;
a determining step for determining, by the signal judging unit of the information processing apparatus that is external to the non-contact type IC whether a result of detection by processing of said detecting step indicates (1) internal access via said data lines by processing of said communicating step, or (2) external access from an external apparatus via said antenna, the external access resulting from a change of electromagnetic field strength by said antenna; and
an access controlling step for controlling the external access from said external apparatus via said antenna when processing of said determining step determines that the result of detection by the processing of said detecting step indicates the external access from said external apparatus via said antenna, and for enabling the internal access to the non-contact IC via said data lines by the processing of the communicating step when said determining step determines that the results of detection indicates internal access,
wherein the memory, memory control unit, and antenna of the non-contact type IC are separate and distinct elements from the signal judging unit of the information processing apparatus.

9. The information processing apparatus as claimed in claim 8,
wherein said informing means notifies the user of the external access by a warning display, sound, light, or vibration.

10. The information processing apparatus as claimed in claim 8,
wherein said informing means changes an informing method according to an access source.

11. The information processing apparatus as claimed in claim 8, further comprising recording means for recording history information on the internal or external access when said detecting means detects the internal or external access to said non-contact type IC.

12. A recording medium on which a computer readable program for making a computer perform information processing of an information processing apparatus having embedded therein a non-contact type integrated circuit (IC) is recorded, said program comprising:
a communicating step for communicating data with said non-contact type IC using data lines of the information processing apparatus that are external to, but connect to, the non-contact type IC, said non-contact type IC including a memory, a memory control unit, and an antenna;
a detecting step for detecting, by a signal judging unit of the information processing apparatus that is external to the non-contact type IC, any access to said non-contact type IC;
a determining step for determining, by the signal judging unit of the information processing apparatus that is external to the non-contact type IC, whether a result of detection by processing of said detecting step indicates (1) internal access via said data lines by processing of said communicating step, or (2) external access from an external apparatus via said antenna, the external access resulting from a change of electromagnetic field strength detected by said antenna; and
an access controlling step for controlling the external access from said external apparatus via said antenna when processing of said determining step determines that the result of detection by the processing of said detecting step indicates the external access from said external apparatus via said antenna, and for enabling the internal access to the non-contact IC via said data lines by the processing of the communicating step when said determining step determines that the results of detection indicates internal access,
wherein the memory, memory control unit, and antenna of the non-contact type IC are separate and distinct elements from the signal judging unit of the information processing apparatus.

13. An information processing apparatus having embedded therein a non-contact type integrated circuit (IC), comprising:
a communicating unit configured to communicate data with said non-contact type IC via data lines of the information processing apparatus that are external to, but connect to, the non-contact type IC, said non-contact type IC including a memory, a memory control unit, and an antenna;
detecting means for detecting any access to said non-contact type IC, said detecting means being external to said non-contact type IC;
determining means for determining whether a result of detection by said detecting means indicates (1) internal access by said communicating unit of the information processing apparatus via said data lines, or (2) external access from an external apparatus via said antenna, the external access resulting from a change of electromagnetic field strength detected by said antenna;
informing means for, when said determining means determines that the result of detection by said detecting means indicates the external access from said external apparatus via said antenna, notifying a user of the external access; and
means for enabling the internal access to the non-contact IC by said communicating unit of the information processing apparatus via said data lines, when said determining means determines that the result of detection by the detecting means indicate, internal access by the communicating unit, wherein the memory, memory control unit, and antenna of the non-contact type IC are separate and distinct elements from the communicating unit, the detecting means, the determining means, and the access controlling means of the information processing apparatus.

14. An information processing method performed by an information processing apparatus having embedded therein a non-contact type integrated circuit (IC), comprising:

a communicating step for communicating data with said non-contact type IC using data lines of the information processing apparatus that are external to, but connect to, the non-contact type IC, said non-contact type IC including a memory, a memory control unit, and an antenna;

a detecting step for detecting, by a signal judging unit of the information processing apparatus that is external to the non-contact type IC, any access to said non-contact type IC;

a determining step for determining, by the signal judging unit of the information processing apparatus that is external to the non-contact type IC, whether a result of detection by processing of said detecting step indicates (1) internal access via said data lines by processing of said communicating step, or (2) external access from an external apparatus via said antenna, the external access resulting from a change of electromagnetic field strength detected by said antenna;

an informing step for, when processing of said determining step determines that the result of detection by the processing of said detecting step indicates the external access from said external apparatus via said antenna, notifying a user of the external access; and enabling the internal access to the non-contact IC via said data lines by the processing of the communicating step when said determining step determines that the results of detection indicates internal access, wherein the memory, memory control unit, and antenna of the non-contact type IC are separate and distinct elements from the signal judging unit of the information processing apparatus.

15. A recording medium on which is recorded a computer readable program for making a computer perform information processing of an information processing apparatus having embedded therein a non-contact type integrated circuit (IC), comprising:

a communicating step for communicating data with said non-contact type IC using data lines of the information processing apparatus that are external to, but connect to, the non-contact type IC, said non-contact type IC including a memory, a memory control unit, and an antenna;

a detecting step for detecting, by a signal judging unit of the information processing apparatus that is external to the non-contact type IC, any access to said non-contact type IC;

a determining step for determining, by the signal judging unit of the information processing apparatus that is external to the non-contact type IC, whether a result of detection by processing of said detecting step indicates (1) internal access via said data lines by processing of said communicating step, or (2) external access from an external apparatus via said antenna, the external access resulting from a change of electromagnetic field strength detected by said antenna;

an informing step for, when processing of said determining step determines that the result of detection by the processing of said detecting step indicates the external access from said external apparatus via said antenna, notifying a user of the external access and enabling the internal access to the non-contact IC via said data lines by the processing of the communicating step when said determining step determines that the results of detection indicates internal access.

wherein the memory, memory control unit, and antenna of the non-contact type IC are separate and distinct elements from the signal judging unit of the information processing apparatus.

* * * * *